United States Patent [19]
Hejlsberg et al.

[11] Patent Number: 5,535,391
[45] Date of Patent: *Jul. 9, 1996

[54] SYSTEM AND METHODS FOR OPTIMIZING OBJECT-ORIENTED COMPILATIONS

[75] Inventors: Anders Hejlsberg, Aptos; Jeffrey Stock, Scotts Valley; Peter Kukol, Aptos; Alex Shtaygrud, San Jose, all of Calif.

[73] Assignee: Borland International, Inc., Scotts Valley, Calif.

[ * ] Notice: The term of this patent shall not extend beyond the expiration date of Pat. No. 5,481,7080.

[21] Appl. No.: 388,851

[22] Filed: Feb. 15, 1995

Related U.S. Application Data

[63] Continuation of Ser. No. 894,706, Jun. 5, 1992, Pat. No. 5,481,708.

[51] Int. Cl.⁶ ........................................ G06F 9/45
[52] U.S. Cl. .................. 395/700; 364/280.4; 364/280.5; 364/DIG. 1
[58] Field of Search .................. 395/700; 364/280.4, 364/280.5

[56] References Cited

U.S. PATENT DOCUMENTS

| | | |
|---|---|---|
| 5,093,914 | 3/1992 | Coplien et al. . |
| 5,265,206 | 11/1993 | Shackelford et al. . |
| 5,327,562 | 7/1994 | Adcock ........................ 395/700 |
| 5,339,438 | 8/1994 | Conner et al. . |
| 5,361,350 | 11/1994 | Conner et al. . |
| 5,371,891 | 12/1994 | Gray et al. ........................ 395/700 |
| 5,481,708 | 1/1996 | Kukol ........................ 395/700 |

OTHER PUBLICATIONS

Chin et al., "Distributed Object–Oriented Programming Systems", ACM Computing Surveys, vol.23, No. 1, Mar. 1991, pp. 91–124.

Liu et al., "Microcomputer Systems: The 8086/8088 Family", Prentice Hall, 1986 pp. 26–39 and 155–160.

Primary Examiner—Kevin A. Kriess
Assistant Examiner—Dennis M. Butler
Attorney, Agent, or Firm—John A. Smart; Michael J. Ritter

[57] ABSTRACT

An object-oriented development system of the present invention includes a language compiler having an optimizer for generating computer applications with improved speed and size. C++ optimization methods of the present invention are described, including virtual function and base optimization, using thunks for virtual member pointers, and passing classes by value. An object-oriented calling convention of the present invention, which affords rapid and efficient access to data and methods of objects, is also described.

19 Claims, 10 Drawing Sheets

```
struct foo
{
    virtual void f( );
};

struct bar
{
    foo a [10] ;        ← GUARANTEED TO BE
};                        OF TYPE "FOO"

foo x;

void f(bar *p)
{
    p -> a[0] .f( );
}   x.f( );
```

ACCESS STATICALLY
(INSTEAD OF THROUGH VIRTUAL DISPATCH TABLE)

*FIG. 3*

```
class X { int i; long j;
public:
    X() { i=0; j=0; } init();
};

X::init() {
    for (i = 0; i < 25; i++)
        j += i;
}
```

NO OPTIM'S → (left)  
-po OPTIM'S (BUT NOT FULL) → (right)

Left:
```
;
; X::init(); X::init()
;
push    bp
mov     bp,sp
;
; {
; for(i = 0; i < 25; i++)
;
les     bx,dword ptr [bp+6]
mov     word ptr es:[bx],0
jmp     short @1@114
@1@58:  @1@58:
;
; j += i;  ; j += i;
;
les     bx,dword ptr[bp+6]
mov     ax,word ptr es:[bx]
cwd
les     bx,dword ptr[bp+6]
add     word ptr es:[bx+2],ax
adc     word ptr es:[bx+4],dx
les     bx,dword ptr[bp+6]
inc     word ptr es:[bx]
@1@114:
les     bx,dword ptr[bp+6]
cmp     word ptr es:[bx],25
jl      short@1@58
;
; }
;
pop     bp
ret
```

Right:
```
;
;
;
push    bp     } FULL OPTIM
mov     bp,sp  } WOULD REMOVE
;
; {
; for(i = 0; i < 25; i++)
;
mov     word ptr [si],0
jmp     short @1@114
```
ACCESSING DS:SI WHICH WAS PASSED
```
;
;
;
mov     word ptr [si]
cwd add     word ptr [si+2],ax
adc     word ptr [si+4]],dx inc     word ptr [si]
@1@114:
cmp     word ptr [si],25
jl      short@1@58
;
; }
;
pop     bp     } FULL OPTIM
ret            } WOULD REMOVE
```

FIG. 7

SYSTEM AND METHODS FOR OPTIMIZING OBJECT-ORIENTED COMPILATIONS

This is a Continuation patent application of Ser. No. 07/894,706, filed Jun. 5, 1992, now U.S. Pat. No. 5,481,708.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of computer systems and, more particularly, to systems and methods for compiling source programs, particularly object-oriented ones, into optimized object code.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program which is written in the high-level language is called the "source code" or source program. The low-level or machine language, on the other hand, comprises "object code." Once created, object code (e.g., .obj file) is a separate program in its own right—it includes instructions which may be executed by the target microprocessor. In practice, however, the object code is usually first linked (i.e., combined) with other object code or libraries, which include standard routines.

Compilers are fundamental to modern computing. Translating human-oriented programming languages into computer-oriented machine languages, compilers allow computer programmers to ignore the machine-dependent details of machine language. Moreover, high-level languages are "portable," a feature which permits a single program to be implemented on several different machines, including ones of vastly different architecture. In this instance, the source program is "ported" (transferred) from one machine to another with little or no revision; instead, the program is simply re-compiled for each target machine. Thus, compilers allow programs and programming expertise to be machine-independent.

A compiler performs two basic tasks: analysis of the source program and synthesis of a machine-language program which instructs the computer to perform the task described by the source program. Most compilers are syntax driven, i.e., the compilation process is directed by the syntactic structure of the source program, as recognized by a compiler's parser. The parser builds the structure out of tokens, the lowest-level symbols used to define a programming language's syntax. This recognition of syntactic structure is a major part of the analysis task. Semantic routines actually supply the meaning (semantics) of the program, based on the syntactic structures. The semantic routines generate the target code or, optionally, some intermediate representation thereof.

Ideally, when a compiler translates a description of an application and maps it onto the underlying machine-level instruction set of a target processor, the resulting code should be at least as good as can be written by hand. In reality, code created by straightforward compilation rarely achieves its goal; instead, tradeoffs of slower performance and/or increased size of the executing application are usually incurred. While compilers simplify the task of creating meaningful programs, they rarely produce machine code which is not only the most efficient (smallest) in size but also executes the fastest.

Object-oriented programming languages (OOPL), such as C++, entail even further difficulties. In particular, data encapsulation, inheritance, and polymorphism—the main advantages of OOPL—all increase the difficulty of implementing optimizing techniques. As a result, optimization efforts to date have been largely restricted to straight procedural (e.g., C) compilers.

SUMMARY OF THE INVENTION

The present invention recognizes a need for providing an object-oriented development environment with an optimizing compiler. A system of the present invention includes a development environment having an optimizing compiler, a linker, and an interface. Through an interface (either command-line or UI driven), an application or system developer supplies source listings to the compiler. From the source listings (including header and include files), the compiler generates object module(s); these may be linked with other object modules or libraries to generate program executable by a target processor.

The optimizing compiler includes a translator, a code generator, and an optimizer. The optimizer provides code optimization methods for improving the speed and/or shrinking the size of a generated application. Methods of the optimizer include global register allocation, dead code elimination, common subexpression elimination, loop invariant code motion, copy propagation, pointer aliasing, induction variable analysis and strength reduction, loop compaction, structure copy inlining, code compaction, redundant load suppression, intrinsic function inlining, and register parameter passing. Additional C++ optimization methods are provided, including virtual function and base optimization, using thunks for virtual member pointers, and passing classes by value. A new object-oriented calling convention of the present invention is also provided for generating executable programs which rapidly and efficiently access data and methods of objects.

BRIEF DESCRIPTION OF THE DRAWINGS

FIG. 3 is a program listing illustrating the static (i.e., determined at compile time) access of a virtual function.

FIG. 7 illustrates code generation with and without object-oriented calling convention of the present invention.

DETAILED DESCRIPTION OF A PREFERRED EMBODIMENT

General Architecture

Figure 1A:
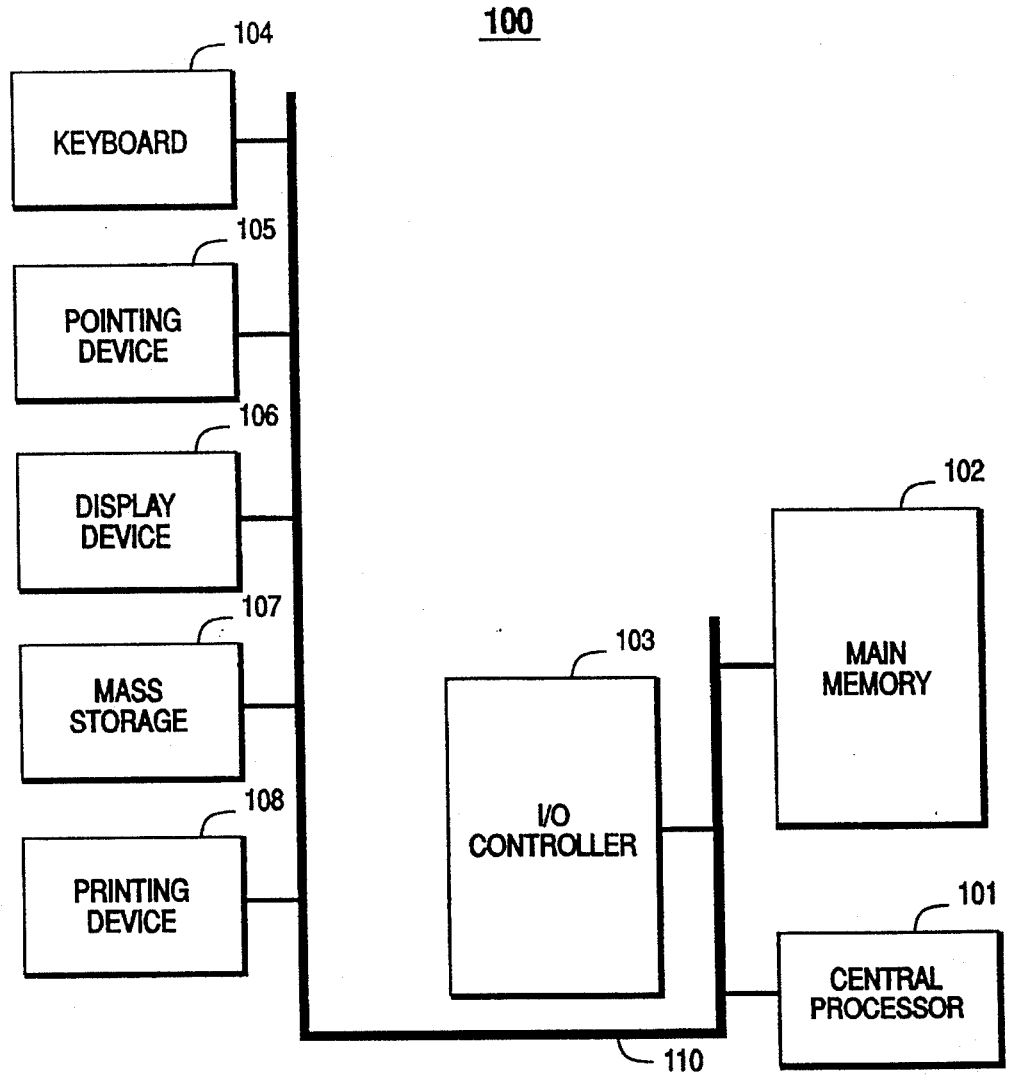
FIG. 1A is a block diagram of a computer system in which the present invention may be embodied.

The present invention may be embodied on a computer system such as the system 100 of FIG. 1, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be provided with the system 100 as desired. As shown, the various components of the system 100 communicate through a system bus 110 or similar architecture.

Figure 1B:
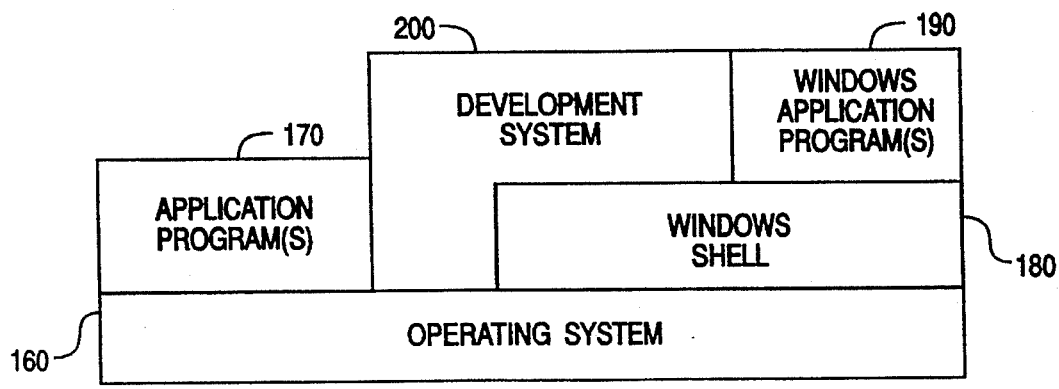
FIG. 1B is a block diagram of a software system for controlling the operation of the system of FIG. 1A.

Illustrated in FIG. 1B, a computer software system 150 is provided for programming the operation of the computer system 100. Software system 150, which is stored in system memory 102 and on disk memory 107, includes an kernel or operating system 160 and a windows shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190, include an interface for receiving user commands and data and displaying results and other useful information.

Software system 150 also includes a development system 200 of the present invention for developing system and application programs. As shown, the development system 200 includes components which interface with the system 100 through windows shell 180, as well as components which interface directly through OS 160.

In a preferred embodiment, the system 100 is an IBM-compatible personal computer, available from a variety of vendors (including IBM of Armonk, N.Y.). Operating system 160 is MS-DOS and shell 180 is Microsoft Windows, both of which are available from Microsoft Corporation of Redmond, Wash.; alternatively, the system 100 may be implemented in other platforms, including Macintosh, UNIX, and the like. Development system 200 includes Borland C++, version 3.0, available from Borland International of Scotts Valley, Calif. Application software 170, 190, on the other hand, can be any one of a variety of software applications, including word processing, database, spreadsheet, text editors, and the like.

Optimization

A. Introduction

The results of optimization are significant to both programmers and end users. Users receive programs optimized for speed, size, or both. Programmers, on the other hand, can write programs in a style that they find most convenient, not in the style that a computer finds most convenient. To achieve these results, optimization methods include techniques to:

1) Decrease the number of processor cycles required by the program;
2) Decrease the number of address calculations performed;
3) Minimize the number of memory fetches; and
4) Minimize the size of the generated object code.

To some extent, these goals may be achieved through "local" optimization. Local optimizations are improvements to small, mostly self-contained blocks of code, such as loops, switches, and "if-else" constructs. Local optimization techniques include elimination of common subexpressions and dead variables, movement of loop-invariant computations, and folding of constants into a single value.

Most programs contain more than just a series of isolated blocks, however. To produce still more efficient code, "global" optimization is required. This type of optimization occurs on a broader scale, with the optimizer seeking inefficiencies that affect multiple blocks. This task is considerably more difficult to achieve because of the more complex data flow analysis that must be performed by the compiler.

An optimizer basically aims at improving an application's speed and shrinking the size of executable files. The prime role of a compiler, on the other hand, is to check the source program's syntax and, if all is in order, generate object code that mirrors the intention of that source code. Being targeted at a particular microprocessor (or family), the object code is dependent on that microprocessor's instruction set and register architecture. Just as a programmer can code a given function in a variety of ways in a high level language, there are many different object code sequences which will achieve the same result. For a given microprocessor, an ideal mapping from source to object code is rarely if ever achieved. Some of these sequences may execute faster, usually at the expense of code size. Others will be smaller in size, but often at the expense of speed. Thus, a compromise often results.

B. Development System

Figure 2A:
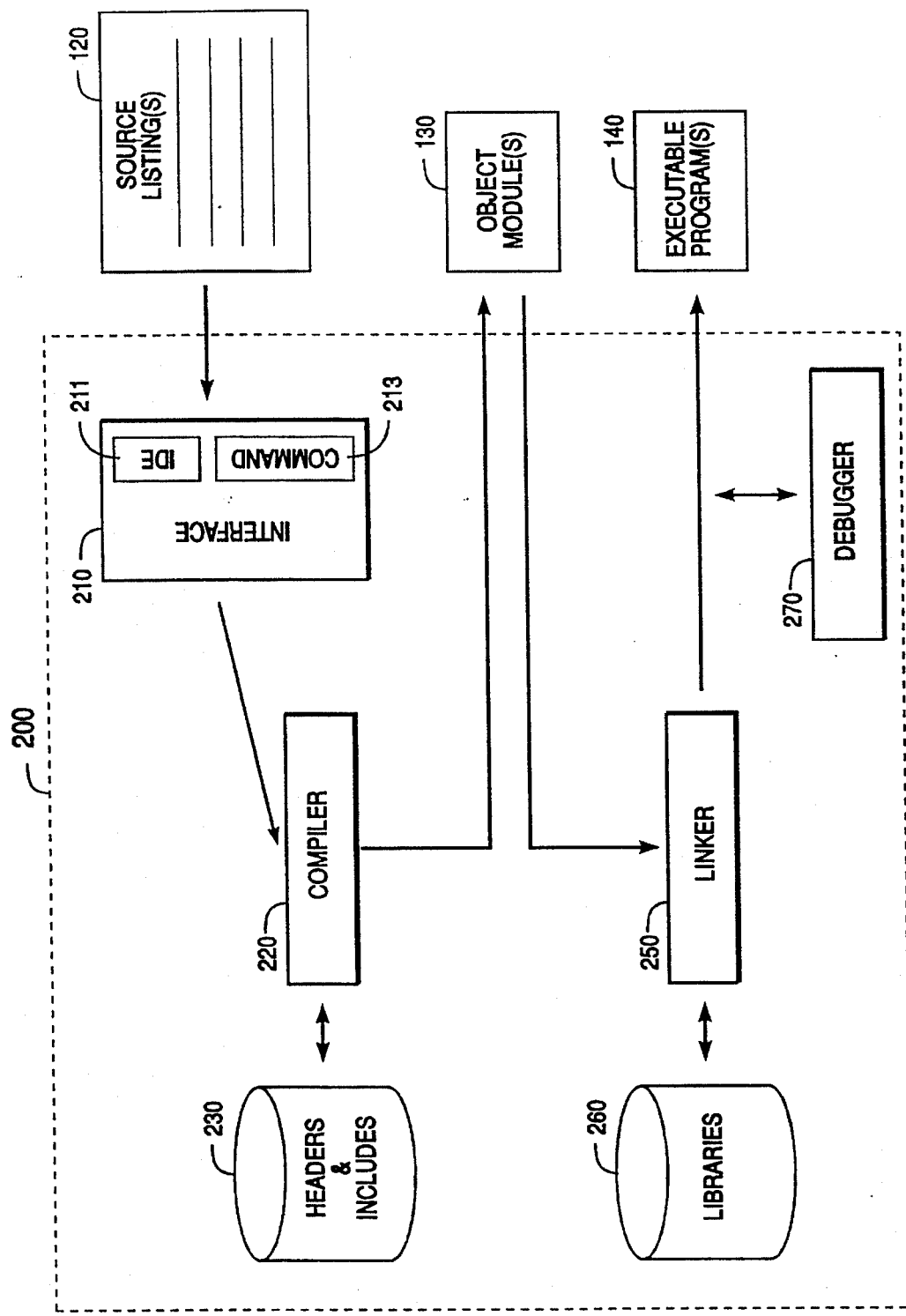
FIG. 2A is a block diagram of a development system of the present invention.
Figure 2B:
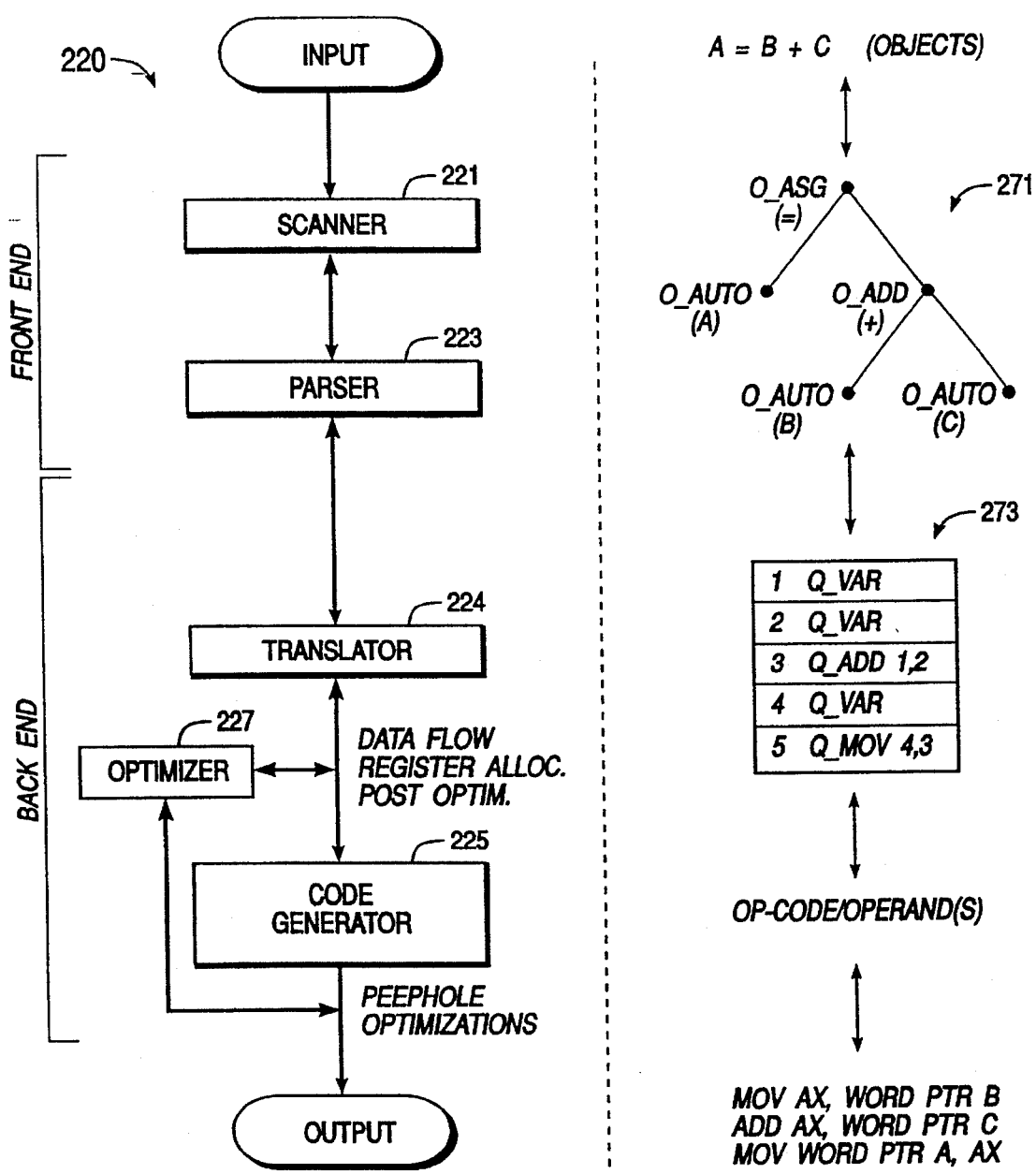
FIG. 2B is a block diagram of the optimizing compiler of FIG. 2A.

Shown in further detail in FIG. 2A–B, the development system of the present invention includes an optimizing compiler 220, a linker 250, and an interface 210. Through interface 210, the user or developer supplies source listings 120 to the compiler 220. Interface 210 includes both command-line driven 213 and Intergrated Development Environment (IDE) 211 interfaces, the former accepting user commands through command-line parameters, the latter providing menuing equivalents thereof. From the source code 120 and header/include files 230, the compiler 220 "compiles" or generates object module(s) 130. In turn, linker 250 "links" or combines the object modules 130 with libraries 260 (e.g., graphics, I/O routines, startup code, and the like) to generate program(s) 140, which may be executed by a target processor (e.g., processor 101 of FIG. 1). A debugging module 270 may be added, as desired, for eliminating errors in the programs 140.

Shown in further detail in FIG. 2B, the optimizing compiler 220 includes a front end and a back end. In particular, the front end includes a scanner 221 and a parser 223, while the back end includes a translator 224, a code generator 225, and an optimizer 227. In basic operation, the scanner 221 reads a source program and breaks it apart into a sequence of tokens, which include identifiers, delimiters, numbers, operators, and the like. In turn, the tokens are read by the parser 223, which understands the semantics of the source language. Given a formal syntax specification, such as a context-free grammar (CFG), the parser generates an intermediate representation (IR code) of the program, for example, by grouping tokens into units as specified by the syntax being used. In the syntax of the C programming language, for example, the expression A=B+C tells the computer to add the values of B and C together to obtain a new value, which is assigned to A. As shown, the IRcode may be provided to the back end as a derivation tree 271, with the parsed tokens accessible from nodes of the tree.

Next, the IR code is passed to the back end of the compiler for code generation. Upon receiving this (e.g., by receiving a pointer to the expression tree 271), the translator 251 reduces the IR code into a table(s) 273 of triples (i.e., three-address representation) or, more preferably, quadruples (i.e., three-address representation with intermediate values referenced by explicit names). Using appropriate op-code lookup tables, these quads are then mapped by the code generator 225 into the object code performing the specified operations. For an introduction to the general construction and operation of compilers, see Fischer et al., *Crafting a Compiler with C*, Benjamin/Cummings Publishing Company, Inc., 1991, the disclosure of which is hereby incorporated by reference.

The basic operation of the compiler 220 is enhanced by the optimizer 227, which will now be described. Optimizer 227 provides code optimization methods for improving the speed and/or shrinking the size of a generated application. Preferably, the user controls what kinds of optimization he or she wants the compiler 220 to perform. In this manner, the programmer may program in the style which he or she finds most convenient.

In an exemplary embodiment of the present invention employing command-line interface 213, code optimizations are controlled through an —O command line option, followed by one or more of suboption letters (listed below). For example, —Oaxt turns on all speed optimizations and assumes no pointer aliasing. To disable or turn off optimizations, on the other hand, the user places a minus character before the optimization letter. For example, —O2— p would turn on all optimizations except copy propagation. As another example, —Od appearing on the command line after an —O2 would disable all optimizations. Some optimizations are also controlled by means other than —O switches. For example, —Z controls redundant load suppression.

Available optimization options in an exemplary command-line embodiment include (with equivalent menuing options also show):

| Parameter | Menu Option/Function |
|---|---|
| -O2 | Options!Compiler!Optimizations!Full Speed Generates the fastest code possible. This is the same as using the following command-line options: -O -Ob -Oe -Og -Oi -Ol -Om -Op -Ot -Ov -k- -Z |
| -O1 | Options!Compiler!Optimizations!Full size Generates the smallest code possible. This is the same as using the following command-line options: -O -Ob -Oe -Os -k- -Z |
| -O | Options!Compiler!Optimizations!Optimize Jumps Removes jumps to jumps, unreachable code, and unnecessary jumps |
| -Oa | Options!Compiler!Optimizations!Assume no pointer aliasing Assume that pointer expressions are not aliased in common subexpression evaluation |
| -Ob | Options!Compiler!Optimizations!Dead code elimination Eliminates stores into dead variables |
| -Oc | Options!Compiler!Optimizations!Common Subexpressions!Optimize locally Enables common subexpression elimination within basic blocks only. The -Oc option and the -Og option are mutually exclusive |
| -Od | Options!Compiler!Optimizations!No Optimizing Disables all optimizations. Note that this is not the same as -O-, which merely disables jump optimizations. |
| -Oe | Options!Compiler!Optimizations!Global register allocation Enables global register allocation and variable live range analysis |
| -Og | Options!Compiler!Optimizations!Common Subexpressions!Optimize globally Enables common subexpression elimination within an entire function. The -Og option and the -Oc option are mutually exclusive |
| -Oi | Options!Compiler!Optimizations!Inline intrinsics Enables inlining of intrinsic functions such as memcpy, strlen, and the like. |
| -Ol | Options!Compiler!Optimizations!Loop optimization Compacts loops into REP/STOSx instructions |
| -Om | Options!Compiler!Optimizations!Invariant code motion Moves invariants code out of loops |
| -Op | Options!Compiler!Optimizations!Copy propagation Propagates copies of constants, variables, and expressions where possible |
| -Os | Options!Compiler!Optimizations!Optimize for!Size Makes code selection choices in favor of smaller code |
| -Ot | Options!Compiler!Optimizations!Optimize for!Speed Selects code in favor of executable speed |
| -Ov | Options!Compiler!Optimizations!Induction Variables Enables loop induction variable and strength reduction optimizations |
| -Ox | None Enables most speed optimizations. This is provided for compatibility with other compilers (e.g., Microsoft C). |
| -Z | Options!Compiler!Optimizations!Suppress redundant loads Suppresses reloads of values which are already in registers |
| -pr | Options!Compiler!Entry/Exit Code!Calling Convention!Register Enables the use of the __fastcall calling convention for passing parameters in registers |

From the selected option(s) and in conjunction with parser 223, optimizer 227 instructs code generator 225 in the generation of optimized object code. Additionally, a —po option is provided, as described in further detail hereinbelow.

C. Optimization Techniques

Principles of optimization, in accordance with the present invention, will now be described in further detail.

1. Global register allocation

Because memory references are computationally expensive in most systems, references are minimized through the intelligent use of registers. Global register allocation both increases the speed and decrease the size of generated applications. With optimizations enabled, the compiler 220 employs global register allocation when compiling the application.

2. Dead code elimination

Although the developer may never intentionally write code to do things which are unnecessary, the optimizer 220 may reveal possibilities to eliminate stores into variables which are not needed. Using —the Ob option to remove stores into dead variables, the optimizer 227 creates a new variable to take the place of the expression a[j].

```
int goo(void), a[10];
int f(void) {
    int i, j;
    j = i = goo( );
    for( j = 0; j < 10; j++)
        a[j] = goo( );
    return i;
}
```

This removes the code to store any result into the variable j, thus eliminating the need for it.

Since the optimizer should preferably determine where variables are no longer used and where their values are needed (live range analysis), the developer will typically use —Oe before using —Ob. Moreover, —Ob is preferably used whenever —Oe is used, since —Ob always results in smaller and faster code.

3. Common subexpression elimination

In common subexpression elimination, optimizer 227 finds duplicate expressions within a target scope, with the calculated value of those expressions stored once so as to avoid recalculating the expression. While this optimization may reduce code size, it mainly serves as a speed optimization technique.

The developer should preferably also use global common subexpression analysis if he or she wishes to reuse expressions rather than create explicit stack locations for them. For example, rather than code

```
temp = t->n.o.left;
if(temp->op == O_ICON    temp->op = O_FCON)
...
the developer could code
if(t->n.o.left->op == O_ICON    t->n.o.left->op == O_FCON)
...
``` and let the optimizer 227 decide whether it is more efficient to create a temporary variable.

If, on the other hand, the developer finds that global common subexpression elimination creates too many temporaries for the developer's code size requirements, he or she can force common subexpression elimination to be done within groups of statements Unbroken by jumps (basic blocks) by turning on local common subexpression elimination via the —Oc command-line option.

4. Loop invariant code motion

Moving invariant code out of loops serves as a speed optimization. The optimizer 227 uses the information about all the expressions in a function gathered during common subexpression elimination to find expressions whose values do not change inside a loop. To prevent the calculation from being done many times inside the loop, the optimizer 227 moves the code outside the loop so that it is calculated only once. It then reuses the calculated value inside the loop.

Loop invariant code motion is used whenever the developer is compiling for speed and the developer has used global common subexpressions. For example, in the code below, x * y * z is evaluated in every iteration of the loop.

```
int v[10];
void f(void) {
    int i,x,y,z;
    for (i = 0; i < 10; i++)
        v[i] = x * y * z;
}
```

The optimizer 227 rewrites the code for the loop as:

```
int v[10];
void f(void) {
    int i,x,y,z,t1;
    t1 = x * y * z;
    for (i = 0; i < 10; i++)
        v[i] = t1;
}
```

Since unnecessary calculations within the loop are eliminated, substantial speed gains may be realized.

5. Copy propagation

Propagating copies is primarily a speed optimization. Since it does not increase the size of the developer code, it is preferably used even when the developer has enabled —Og. Like loop invariant code motion, copy propagation relies on the analysis performed during common subexpression elimination. Copy propagation means that the optimizer 227 remembers the values assigned to expressions and uses those values instead of loading the value of the assigned expressions. Copies of constants, expressions, variables, and the like may be propagated.

In the following code, for example, the constant value 5 is used in the second assignment instead of the expression on the right side.

```
PtrParIn->IntComp = 5;                      // 1st assign
( *( PtrParIn->PtrComp ) ).IntComp =        // 2nd assign
PtrParIn->IntComp;                          // use 5 instead
```

6. Pointer aliasing

While not strictly an optimization, pointer aliasing affects the way the optimizer performs common subexpression elimination and copy propagation. When pointer aliasing is enabled, it allows the optimizer 227 to maintain copy propagation information across function calls and maintain common subexpression information across some stores. Otherwise, the optimizer should preferably discard information about copies and subexpressions in these situations. Since pointer aliasing might lead to errors or bugs which are hard to spot, it is preferably applied only when the developer uses —Oa.

The parameter —Oa controls how the optimizer 227 treats expressions which contain pointers. When compiling with global or local common subexpressions and —Oa enabled, the optimizer 227 will assume that pointer expressions are not aliased in common subexpression evaluation and recognize

*p * x as a common subexpression, for example, as shown in the following function, foo:

```
int g, y;
int foo(int *p) {
    int x = 5;
    y = *p * x;
    g = 3;
    return (*p * x);
}
```

If not employed correctly, however, an error may result, for example:

```
void goo(void) {
    g = 2;
    foo(&g);    /* This is incorrect, since the
                   assignment g = 3
                   invalidates the expression *p * x */
}
```

—Oa also controls how the optimizer treats expressions involving variables whose address has been taken. When compiling with —Oa, the compiler assumes that assignments via pointers will only affect those expressions involving variables whose addresses have been taken and which are of the same type as the left hand side of the assignment in question.

To illustrate this concept, consider the following function.

```
int y, z;
int f(void) {
    int x;
    char *p = (char *)&x;
    y = x * z;
    *p = "a";
    return (x*z);
}
```

When compiled with —Oa, the assignment *p='a' will not prevent the optimizer 227 from treating x*z as a common subexpression, since the destination of the assignment, *p, is a char, whereas the addressed variable is an int. When compiled without —Oa, the assignment to *p prevents the optimizer from creating a common subexpression out of x*z.

7. Induction variable analysis and strength reduction

Creating induction variables and performing strength reduction are speed optimizations performed on loops. The optimizer 227 employs induction to create new variables out of expressions used inside a loop; these variables are called "induction variables." The optimizer 227 assures that the operations performed on these new variables are computationally less expensive (reduced in strength) than those used by the original variables.

Opportunities for these optimizations are common if the developer uses array indexing inside loops (since a multiplication operation is required to calculate the position in the array which is indicated by the index). For example, in the code:

```
int v[10];
void f(void) {
    int i,x,y,z;
    for (i = 0; i < 10; i++)
        v[i] = x * y * z;
}
``` the optimizer 227 creates an induction variable out of the operation v[i], since the v[i] operation would require a multiplication. The induction variable also eliminates the need to preserve the value of i. Thus with —Ov enabled, the optimizer 227 changes this code to the following:

```
int v[10];
void f(void) {
    int i,x,y,z, *p;
    for (p = v; p < &v[10]; p++)
        *p = x * y * z;
}
```

Preferably, the developer will use —Ov whenever he or she is compiling for speed in source code which contains loops.

8. Loop compaction

Loop compaction takes advantage of the instruction set of 80×86 processors by replacing the code for a loop with an equivalent string move instruction. For example, for the code:

```
int v[100];
void t(void) {
    int i;
    for (i = 0; i < 100; i++)
        v[i] = 0;
}
``` the compiler 220 generates the following machine instructions:

```
mov     cx,100
mov     di,offset DGROUP:_v
push    ds
pop     es
mov     ax,0
rep     stosw
``` which benefits from the rep stosw instruction of the 80×86.

Preferably, the developer will use —O1 to compact loops whenever he or she is generating code for speed. Depending on the complexity of the operands, the compacted loop code may also be smaller than the corresponding non-compacted loop.

9. Structure copy inlining

Inlining of structure copies provides substantial optimization when compiling for speed. When the developer enables —Ot, the compiler 220 determines whether it can safely generate code to perform a rep movsw instruction instead of calling a helper function to do the copy. For structures and unions of over 8 bytes in length, performing this optimization produces faster structure copies than the corresponding helper function call.

10. Code compaction

In contrast to structure copy inlining, code compaction provides substantial optimization when compiling for size.

In code compaction, the optimizer scans the generated code for duplicate sequences. When such sequences warrant, the optimizer replaces one sequence of code with a jump to the other, thereby eliminating the first piece of code. SWITCH statements contain the most opportunities code compaction.

11. Redundant load suppression

Load suppression is both a speed and size optimization. When —Z is enabled, the optimizer keeps track of the values it loads into registers and suppresses loads of values which it already has in a register. For example, when compiling the following code with —Z enabled (and with copy propagation turned off), the optimizer 227 specifies that the value of *x which has been loaded is pushed into ES:BX instead of reloading the same value:

```
void f(void) {
    int *x = 5;
    goo(*x);
}
```

The developer should preferably use this optimization whenever he or she is compiling with the optimizer enabled.

12. Intrinsic function inlining

There are times when the developer would like to use one of the common string or memory functions, such as strcpy() or memcmp(), but he or she does not want to incur the overhead of a function call. By using —Oi, the compiler 220 generates the code for these functions within the developer function's scope, eliminating the need for a function call. At the expense of size, the resulting code executes faster than a call to the same function.

Functions which are inlined when —Oi is enabled include:

| memchr | strcmp | strrchr |
| memcmp | strcpy | rotl |
| memcpy | strlen | rotr |
| memset | strncat | fabs |
| stpcpy | strncmp | alloca |
| strcat | strncpy | |
| strchr | strnset | |

The developer can also control the inlining of each of these functions with the #pragma intrinsic. For example, pragma intrinsic strcpy would cause the compiler 220 to generate code for strcpy in the developer's function.

pragma intrinsic —strcpy would prevent the compiler from inlining strcpy. Using these pragmas in a file will override the command-line switches or IDE options used to compile that file.

When inlining, the compiler actually creates a macro which renames the inlined function to a function which the compiler internally recognizes. When inlining any intrinsic function, therefore, the developer should preferably include a prototype for that function before he or she uses it. In the above example, the compiler would create a macro define strcpy __strcpy__ where, the compiler 220 recognizes calls to functions with two leading and two trailing underscores and tries to match the prototype of that function against its own internally stored prototype. If the developer did not supply a prototype or the one supplied does not match the compiler's internal prototype, the compiler should reject the attempt to inline that function and generate an error.

13. Register parameter passing

The command line interface includes a "__fastcall" calling convention. Functions declared using this modifier expect parameters to be passed in registers. The compiler 220 treats this calling convention (i.e., __fastcall modifier) as a new language specifier, such as "__cdecl" and "__pascal". Functions declared with either of these two language modifiers should not also have the __fastcall modifier, since they use the stack to pass parameters. Likewise, the __fastcall modifier should not be used together with __export and __loads. The compiler generates a warning if the developer try to mix functions of these types, including inappropriate uses of the __fastcall modifier. The developer may, however, use functions with the __fastcall convention in overlaid modules (e.g., VROOMM™ available from Borland International).

A preferred maximum of three parameters may be passed in registers to any one function. The developer should preferably not assume that the assignment of registers will reflect the ordering of the parameters to a function. According to the present invention, the preferred registers used for each parameter type may be summarized as follows:

| Parameter Type | Registers |
| --- | --- |
| character (signed and unsigned) | AL, DL, BL |
| integer (signed and unsigned) | AX, DX, BX |
| long (signed and unsigned) | DX:AX |
| near pointer | AX, DX, BX |

Far pointer, union, structure, and floating point (float and double) parameters are pushed on the stack.

Functions declared with the fastcall modifier have different names than their non-__fastcall counterparts. The compiler prefixes the __fastcall function name with an "@". This prefix applies to both unmangled C function names and to mangled C++ function names.

D. C++ Optimization Techniques

Optimizer 227 also implements several C++ specific optimizations in a fashion transparent to the programer. In a preferred embodiment, available techniques include virtual function and base optimizations, using thunks for virtual member pointers, and passing classes by value. Additionally, a new calling convention is provided. Each of these will now be described in further detail.

1. Virtual function and base optimizations.

When calling virtual functions or accessing virtual base classes, the compiler 220 binds the function or base class address at compile time whenever it is able to determine statically (at compile time) the true type of the object being accessed. For example, given the sample code:

```
struct  foo
{
    virtual void func( );
    double      member;
    foo( );
    foo(foo&);
    ~foo( );
};
extern  foo   x;
extern  foo   *p;
void    (foo::*mp)( );
void    f(foo);
void    func( )
{
    x.func( );        // virtual fn bound statically
```

```
        (p->*mp)( );    // member ptr call -> uses thunk
        f(x);           // pass class "x" by value
    }
``` the compiler 220 generates the following code for x.func:

```
mov     ax,offset DGROUP:_x
push    ax
call    near ptr @foo@func$qv    ; static binding of foo::func
pop     cx
```

As demonstrated by the example, this method of the present invention generates code which is not only smaller but also faster.

As shown in FIG. 3, the optimization may be extended to arrays which are known to the compiler, such as those declared in the source listing as being an "array" (as opposed to a mere block of memory accessed through a pointer). In the function:

```
struct foo
{
    virtual void f( );
};
struct bar
{
    foo a[10];       // declare an array of type "foo"
};
foo x;               // declare a global of type "foo"
void f(bar *p)
{
    p -> a[0].f( );  // access statically
    x.f( );
}
```

As declared, "a" is known to the compiler to be an array of type "foo". Thus, the access to the virtual function f() may be made statically, i.e., without accessing the function through the dynamic dispatch mechanism (Virtual Dispatch Table) which may be computationally more expensive.

2. Using thunks for virtual member pointers

For pointers to function members of classes, instead of encoding explicitly (in the member pointer value) whether the member being pointed to is a virtual function, the information is implicitly encoded through the use of virtual call thunks. Using the example code shown above, the following code is generated by compiler 220 for the member pointer call (p→*mp)():

```
push word ptr DGROUP:_p
call word ptr DGROUP:_mp ; call the thunk
pop cx
```

In this instance, the thunk pointed to by the member pointer will appear as:

```
@$vc1$NNN0$1$0$        segment    virtual
@@$vc1$NNN0$1$0$       label      word
    mov    bx,sp
    mov    bx, ss:[bx+2]
    mov    bx, [bx+0]
    jmp    word ptr ds:[bx]
@$vc1$NNN0$1$0$        ends
```

In contrast, explicit encoding for the member pointer call would require, for example:

```
mov    ax,word ptr DGROUP:_p
add    ax,word ptr DGROUP:_mp
push   ax
cmp    word ptr DGROUP:_mp+2,0
je short @1@74
mov    bx,word ptr DGROUP:_p
add    bx,word ptr DGROUP:_mp
add    bx,word ptr DGROUP:_mp+4
mov    bx,word ptr [bx]
mov    ax,word ptr DGROUP:_mp+2
dec    ax
add    bx,ax
mov    ax,word ptr [bx]
jmp    short @1@98
@1@74:
mov    ax,word ptr DGROUP:_mp+4
@1@98:
call   ax
pop    cx
```

Thus, the method of the present invention employs smaller member pointers. As a result, more efficient calls may be made through them.

3. Passing classes by value

When an argument of type class with user-defined constructors is passed by value to a function, one might pass a reference to a temporary instead, with the caller assuming responsibility for destroying this temporary, if needed. This is illustrated in the following code, generated for the call f(x) in the example above:

```
mov     ax,offset DGROUP:_x
push    ax
lea     ax,word ptr [bp-10]
push    ax
call    near ptr @foo@$bctr$qr3foo     ; create temporary
pop     cx
pop     cx
lea     ax,word ptr [bp-10]
push    ax
call    near ptr @f$q3foo              ; call f
pop     cx
mov     ax,2
push    ax
lea     ax,word ptr [bp-10]
push    ax
call    near ptr @foo@$bdtr$qv         ; destroy temporary
pop     cx
pop     cx
```

In a preferred embodiment of the present invention, however, Compiler 220 copy-constructs the argument value directly to the stack, with the callee assuming responsibility for destruction of this value, as shown in the following generated code for f(x):

```
sub     sp,10                          ; make room on stack
mov     ax,offset DGROUP:_x
push    ax
lea     ax,word ptr [bp-10]
push    ax
call    near ptr @foo@$bctr$qr3foo     ; create x
pop     cx
pop     cx
call    near ptr @f$q3foo              ; call f (f destroys x later)
add     sp,10
```

Figure 4:
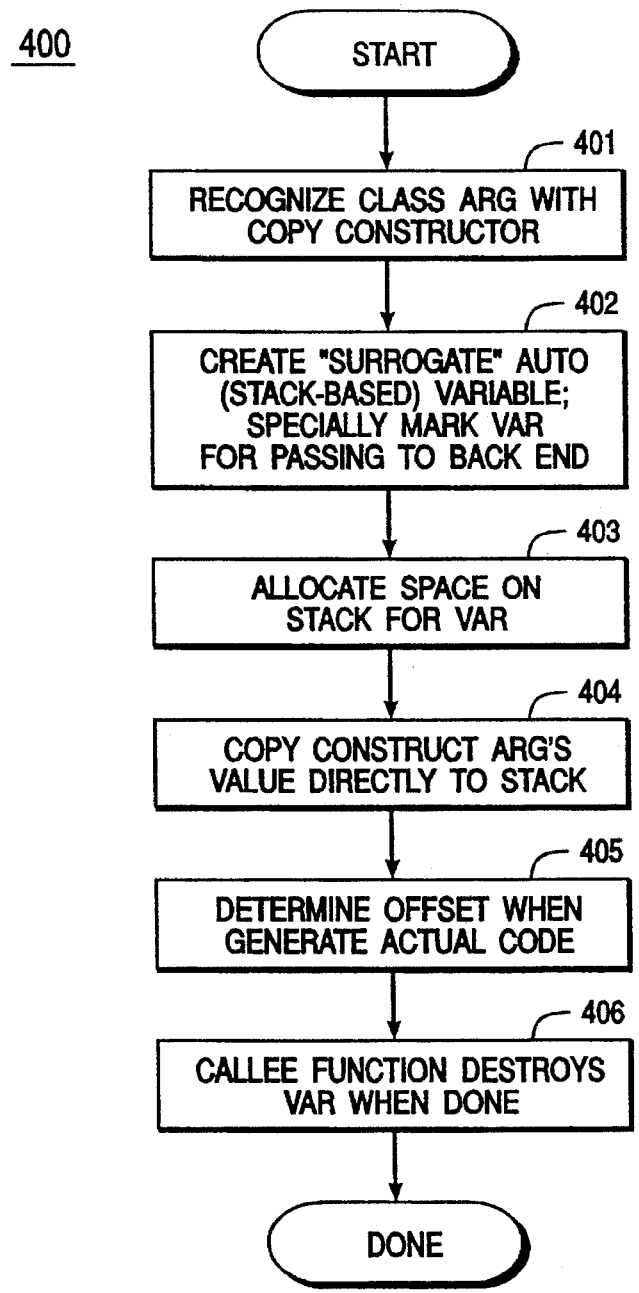
FIG. 4 is a flowchart illustrating a method of the present invention for passing classes by value.

Illustrated with a flowchart 400 in FIG. 4, the steps of this method will now be described in further detail. In step 401, the front end of the compiler 220 recognizes a class argument with a copy constructor. In step 402, a "surrogate" automatic (i.e., stack-based) variable is created. This variable is distinguished from normal automatic variables, by a unique prefix for example, so that the back end will recognize it as a surrogate automatic. In step 403, space is allocated on the stack for the surrogate, with the argument's value copy constructed directly into this allocated space in step 404. In step 405, determination of the offset (i.e., BP offset) of the surrogate within the stack frame is deferred until code actually referencing the surrogate is generated. Step 406 is included to indicated that the callee function preferably assumes responsibility for cleaning up the stack after returning control to the caller; alternatively, the caller may assume this responsibility. In this fashion, the function call overhead (both in terms of code and stack space) is reduced. Moreover, quicker access to the argument inside the called function is afforded as well.

4. Object-oriented calling convention

The present invention includes a new calling convention, "Object Data", providing true "object-oriented" code generation for Intel 80×86-compatible microprocessors and the like. Optimizing the access of object data, the calling convention significantly increases the speed of programs, while reducing code size (e.g., 20 percent or more). While applicable to both 16-bit DOS and Microsoft Windows programs, the calling convention is especially effective in reducing the size of the latter.

Figure 5A:
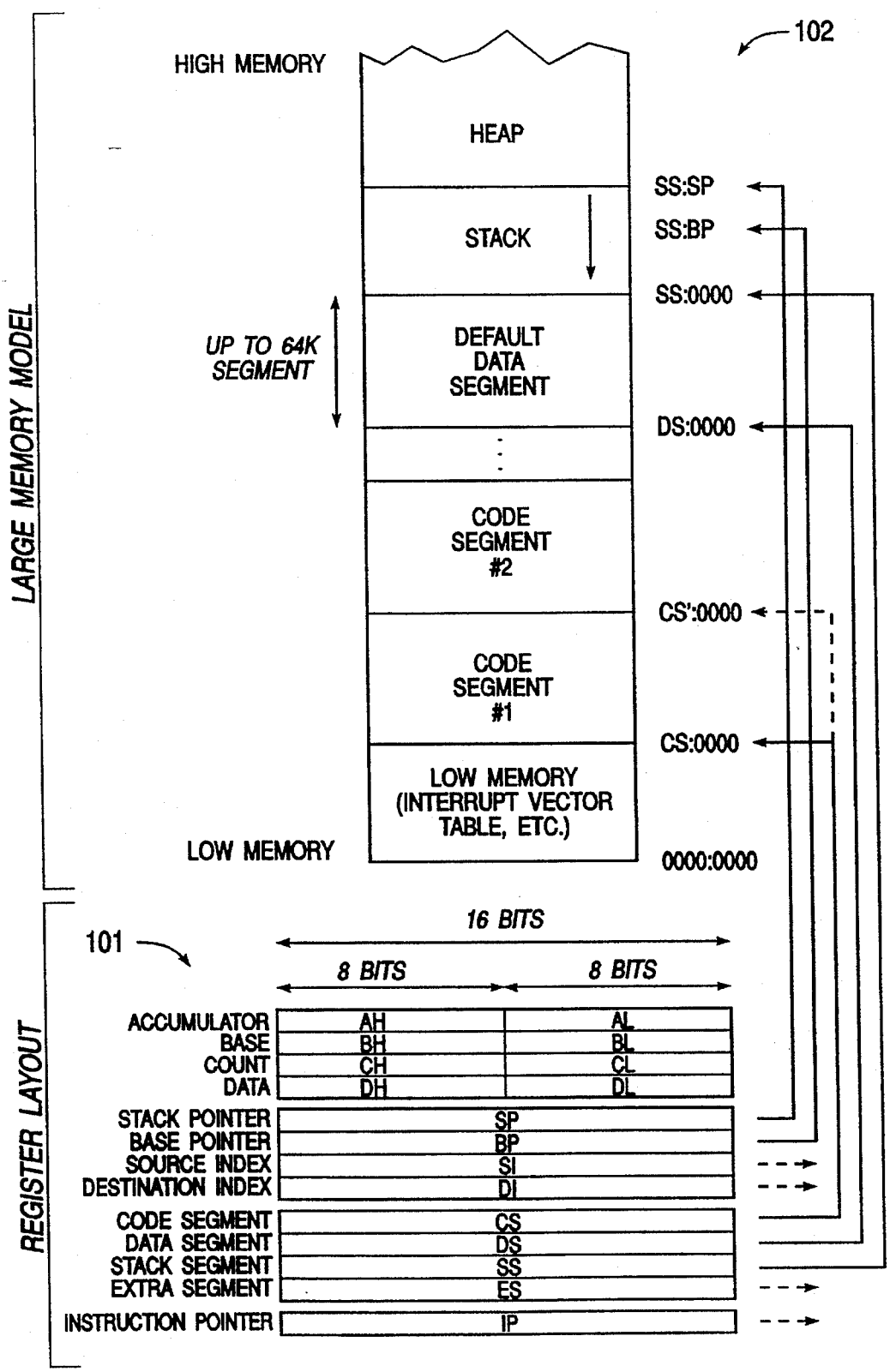
FIGS. 5A–C are block/schematic diagrams of various memory/CPU register configurations which illustrate an objected-oriented calling convention of the present invention.

To understand the benefits of the Object Data calling convention, it is first helpful to examine the general organization of functionally-oriented programs, for example, as shown in FIG. 5A..for a large memory model on an 80×86-compatible architecture. In traditional, non-object oriented languages, a program basically references two types of variables: global and local. As shown, compilers have placed the global data constructs for an executable program into a data segment of memory 102, with references to individual data members achieved through a data segment or "DS" register of CPU 101. The local variables, on the other hand, are created on the "stack" (last-in, first-out segment of memory 102); references to these data members are achieved through the stack segment or SS register of CPU 101. The general layout of 80×86 architecture (including memory configuration for tiny, small, medium, compact, and huge memory models) is documented in the technical literature. See e.g., Hummel, R., *Programmer's Technical Reference: The Processor & Coprocessor*, Ziff-Davis Press, 1992; the disclosure of which is hereby incorporated by reference. Additional description is appended herewith in Appendix C, Programmer's Guide: DOS Memory Management (Chapter 9).

Instead of just two data types, object-oriented programming includes three types: global data, local data, and object data. The latter two data types—object data and local data—are the most important: the impetus of "object-oriented programming" is to get developers to focus on the data and functions at the object level, not at the global level. Recognizing this, the present invention provides an "object-oriented memory model" which shifts the focus of a memory model to the objects.

Figure 5B:
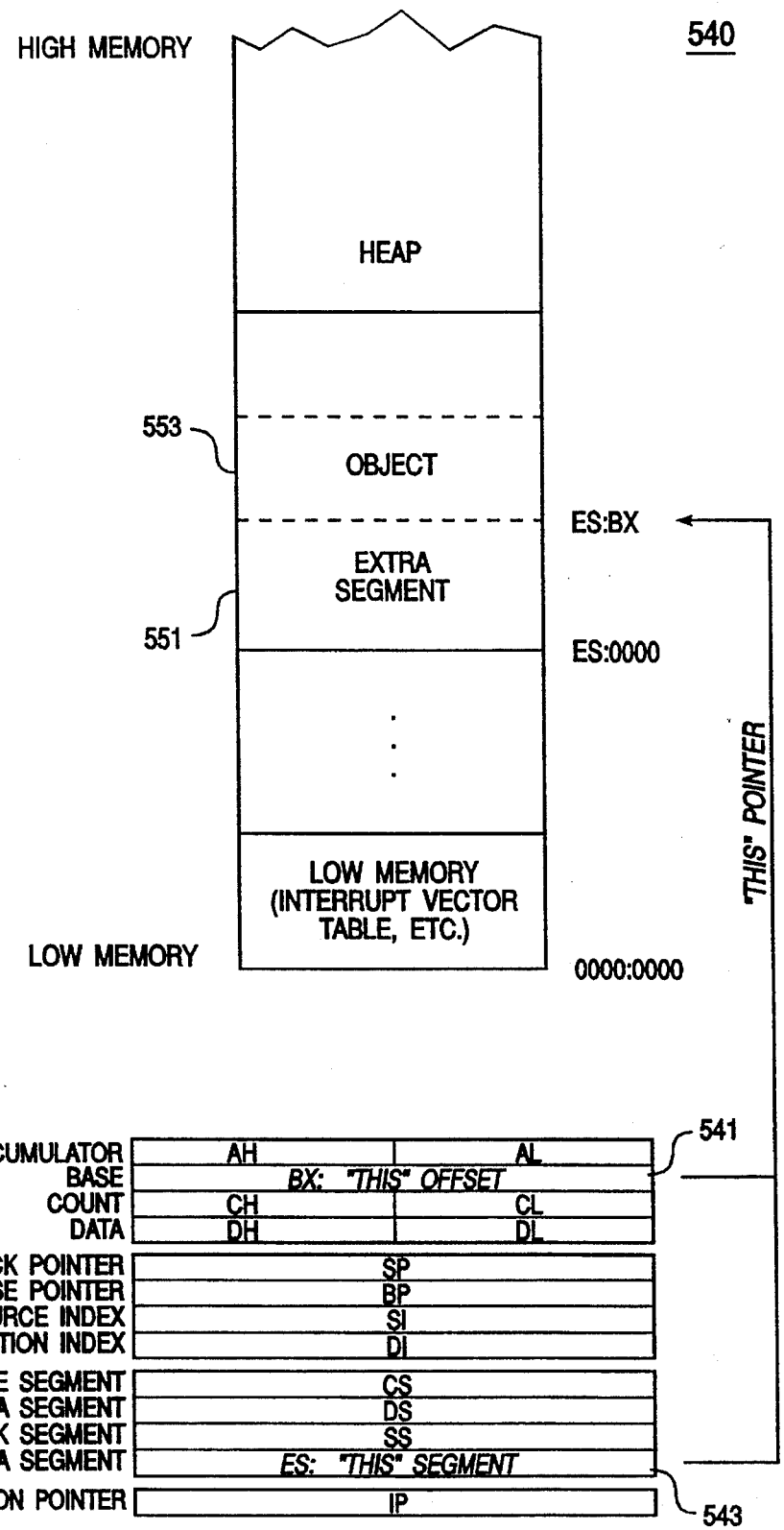

Nonetheless, conventional compilers emit code as if global data and local data were the most important data, with references to object data incurring a substantial penalty. Referring to FIG. 5B, this problem will be illustrated. In a large memory model 540 implemented with conventional technology, for example, whenever the programmer references object data, he or she loads a self-referential pointer to the object (the "this" or "self" pointer, which is implicitly. declared by the language) into the ES:BX register pair for dereferencing the object. Specifically, the "data segment" or high-order word of the pointer is loaded into ES register 543 and the "offset" or low-order word is loaded into BX register 541.

Figure 5C:
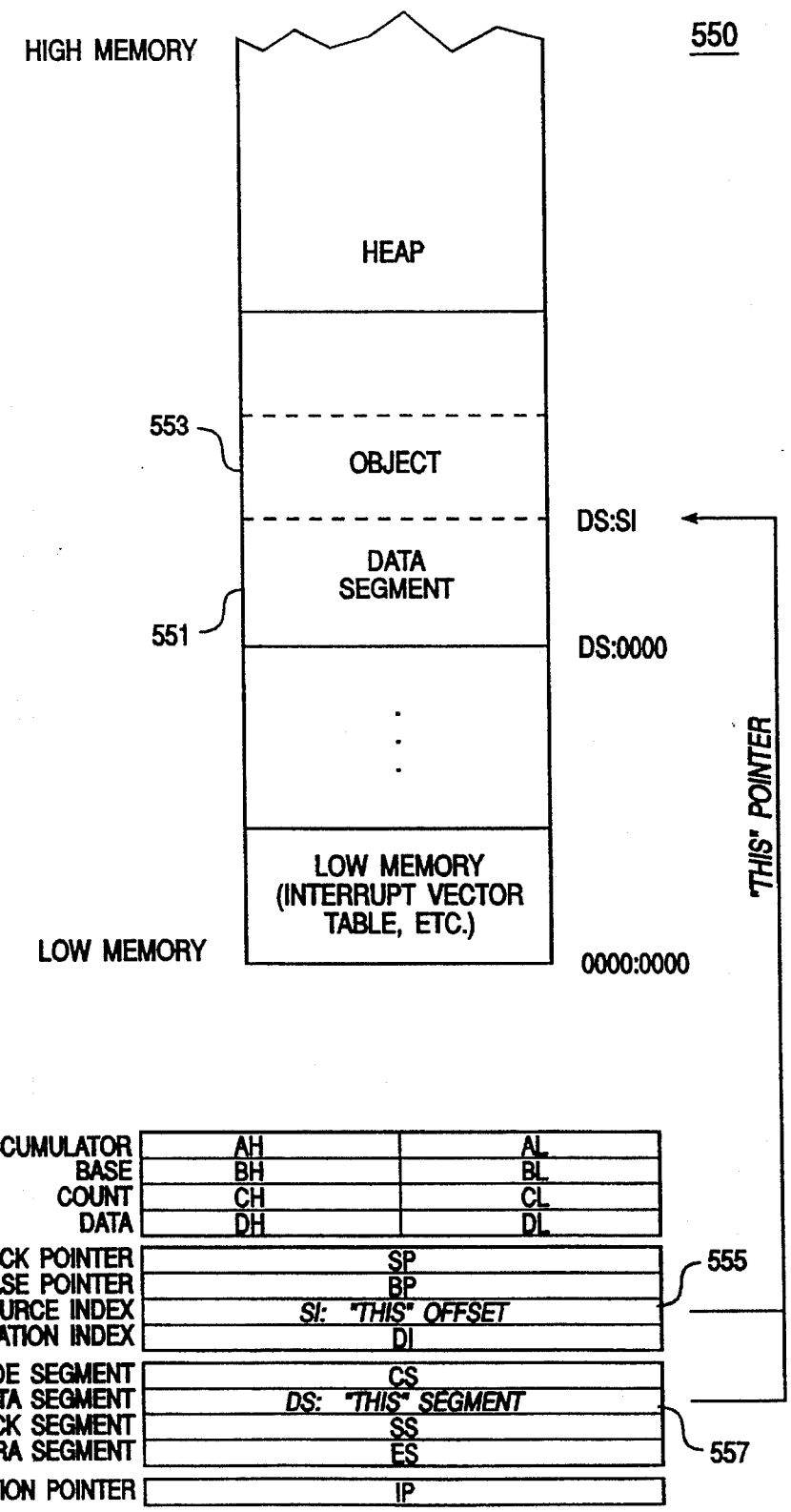

Shown in FIG. 5C, organization of the object-oriented memory model of the present invention will be described. As shown, the "this" pointer is automatically placed into a <data segment addressing register>:<indexing register> pair, such as the DS:SI register pair. Specifically in a preferred embodiment, the segment portion of the address reference is stored in DS register 557, with the offset portion loaded into SI register 555. From the DS:SI register pair, a memory address may be formed for accessing the physical locations of the memory (e.g., an 80×86 20-bit address). In an alternative, less preferred embodiment, the offset may be stored in another indexing register (e.g., DI or BX).

In a preferred embodiment, the calling convention is invoked by default, or at least when object-oriented constructs (e.g., class definitions and object declarations) are encountered by the compiler 220. In the instance where the calling convention has been turned off, one may employ an appropriate identifier or function modifier for instructing the compiler and linker to employ the Object Data calling convention to selected classes and/or their member functions An identifier of "__fastThis" "__nearThis" or "__objectData" is employed for this purpose; case sensitivity may be adapted as required for one's particular environment. When applied to a class, the modifier causes the calling convention to be employed with all member functions of that class. Alternatively, one may apply the modifier to just selected member functions, with the calling convention only employed for those selected ones. Use of the modifier is analogous to the invocation of the C calling convention with "__cdecl" or the Pascal calling convention with "__pascal". Unlike the other two, however, __objectData does not mandate how arguments are passed; thus, it may be used in addition to (not in lieu of) these and other calling conventions, including __fastcall.

In addition to the above function modifier, a developer may employ pragma statements to achieve selective or global use of __objectData. For example, the calling convention may be enabled with:

pragma —po or disabled with:

pragma l'po—

All told, the developer has complete flexibility in controlling the use of the calling convention in his or her program.

Figure 6:
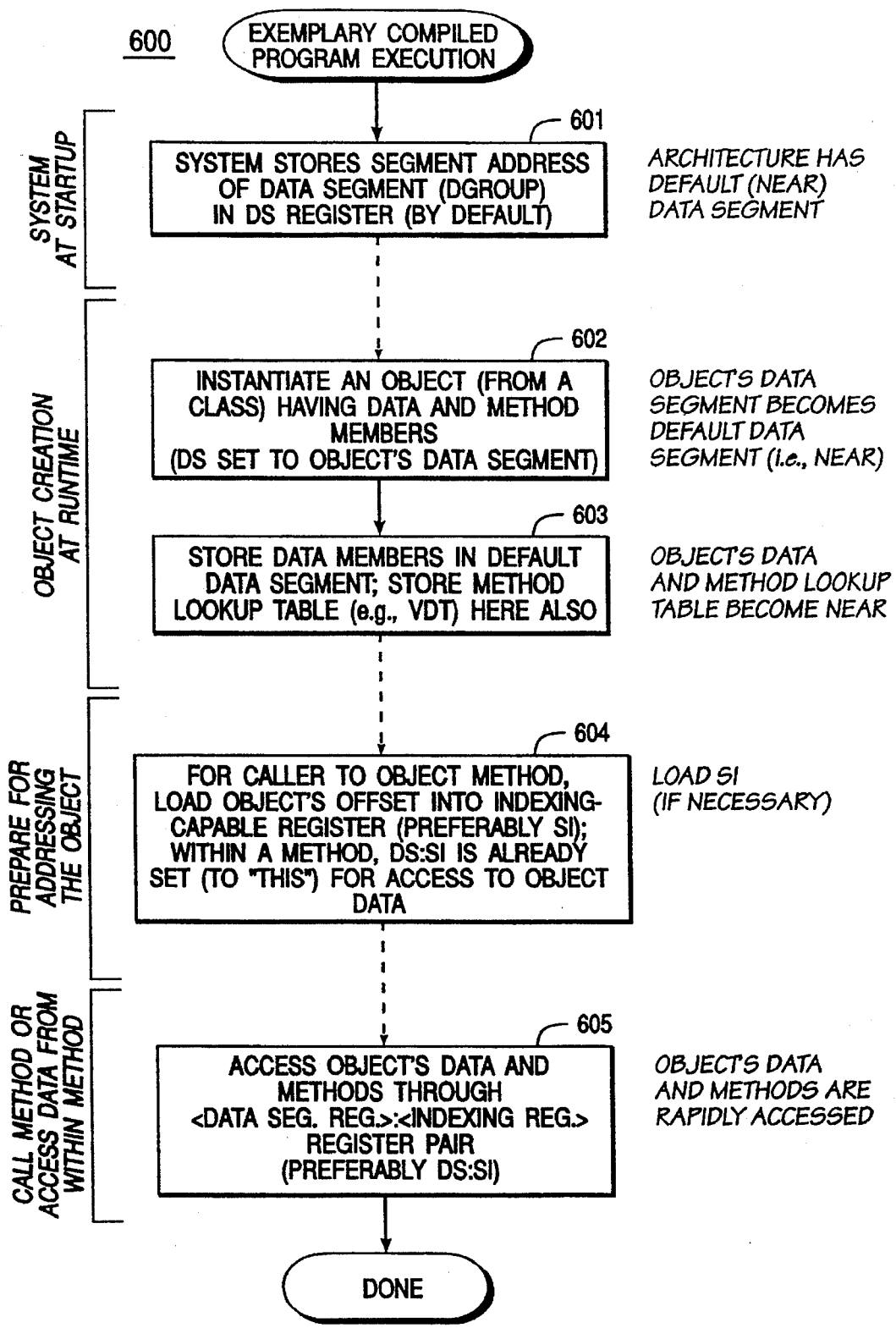
FIG. 6 is a flowchart illustrating the object-oriented calling convention of the present invention operative within an executing program (generated by the compiler of FIG. 2B).

Illustrated with a flowchart 600 in FIG. 6, a method for employing the calling convention of the present invention, such as exemplified by an executing application compiled by the development system 200, will now be described. While not actually a required step, step 601 is shown to illustrate that in a segmented architecture, such as the system 100, a default data segment is associated with a particular segment-addressing register. In the Intel 80×86 platform, for example, a program commonly stores the segment address of a particular data segment of memory in the DS register at startup (e.g., ASSUME DS:DGROUP).

Steps 602 and 603 illustrate actual object creation at runtime (similar methodology may be applied for staticly created objects as well). In step 602 an object is instantiated from a defined class, the object including both methods and data members of its class. Access to members may be private, protected, or public as is specified by C++ member access control; see e.g., Ellis M. and Stroustrup B., *The Annotated C++ Reference Manual*, Addison-Wesley, 1990, the disclosure of which is hereby incorporated by reference. In step 603, the data member(s) of the object are stored in the default data segment in memory 102 (whose segment address has already been loaded into the DS register at startup). Information for accessing methods of the object (e.g., dispatch tables) is preferably stored here as well.

After creation of an object, it may now be accessed by the system; specifically, methods of the object may be called (according to program-specified access control) and data of the object may be accessed (typically, restricted to access by member functions or methods). As shown by step 604, for example, access to the object's methods or data is desired. At step 605, the system prepares for addressing (i.e., accessing) the object. As will be recalled from step 603, the data segment addressing register (DS) already stores the segment address of the object (i.e., high-order word of "this" pointer).

The offset to the object .(i.e., lower-order word of "this" pointer), on the other hand, is dealt with as follows. For accessing a method of the object (i.e., calling a method of the object), the object's offset is loaded into an indexing register, most preferably the SI register. For accessing data of the object, however, the offset is in fact already loaded in SI (as it is to be accessed by a method of the object). Similar instances of SI already being loaded may include member functions calling each other and/or themselves (recursion).

Finally, at step 606, actual access to the object's methods and data members is achieved by deferencing the desired object member with the DS:SI register pair. Accesses to additional data members and/or methods may be conveniently and rapidly accomplished, for example by using based-indexed (such as [BX+SI]) addressing, as desired.

Referring now to FIG. 7, code generation for the __objectData calling convention will be illustrated. Given the code snipet:

```
// DEMO.CPP
// When optimized, to be compiled with -po -ml -Vf -O
class X
{
    int i;
    long j;
public:
    X( ) {i = 0; j = 0; }
    init( );
};
X::init( )
{
    for(i = 0; i < 25; i++)
        j += i;
}
```

A conventional compiler might generate the following assembler code (e.g., BC++ non —po version):

```
        .286p
        ifndef      ??version
?debug  macro
        endm
publicdll macro     name
        public      name
        endm
$comm   macro       name,dist,size,count
        comm dist name:BYTE:count*size
        endm
        else
$comm   macro       name,dist,size,count
        comm dist name[size]:BYTE:count
        endm
        endif
        ?debug      V 300h
          ?debug S "DEMO.cpp"
        ?debug    C E9FC71BD18096A6F686E732E637070
DEMO_TEXT segment byte public 'CODE'
DEMO_TEXT ends
DGROUP      group       _DATA,_BSS
        assume      cs:DEMO_TEXT,ds:DGROUP
_DATA       segment word public 'DATA'
d@      label       byte
d@w     label       word
_DATA       ends
_BSS segment word public 'BSS'
b@      label       byte
b@w     label       word
_BSS ends
DEMO_TEXT segment byte public 'CODE'
;
; X::init( )
;
        assume cs:DEMO_TEXT
@X@0init$qv proc far
    push bp
    mov bp,sp
;
; {
;       for(i = 0; i < 25; i++)
    les bx,dword ptr [bp+6]
    mov word ptr es:[bx],0 ; *** ES segment overrides here & below
    jmp short @1@114
@1@58:
```

```
;       j += i;
;
    les   bx,dword ptr [bp+6]
    mov   ax,word ptr es:[bx]
    cwd
    les   bx,dword ptr [bp+6]
    add   word ptr es:[bx+2],ax
    adc   word ptr es:fbx+4],dx
    les   bx,dword ptr [bp+6]
    inc   word ptr es:[bx]
@1@114:
    les   bx,dword ptr [bp+6]
    cmp   word ptr es:[bx],25
    jl    short @1@58
;
; }
;
    pop   bp
    ret
@X@0init$qv    endp
    ?debug        C E9
    ?debug        C FA00000000
DEMO_TEXT     ends
_DATA          segment word public 'DATA'
s@ label       byte
_DATA          ends
DEMO_TEXT     segment byte public 'CODE'
DEMO_TEXT     ends
    public       @X@0init$qv
_s@ equ s@
    end
```

As seen, the inefficient technique of multiple ES segment overrides is employed.

Even with present day optimizing C++ compilers, such as Microsoft C/C++ 7.0, the results of the present invention are not obtained:

```
;   compiled with MSC/C++ 7.0 version
;   Static Name Aliases
;
        TITLE DEMO.cpp
        .8087
INCLUDELIB    LLIBCE
INCLUDELIB    OLDNAMES.LIB
DEMO_TEXT     SEGMENT WORD PUBLIC "CODE"
DEMO_TEXT     ENDS
_DATA         SEGMENT WORD PUBLIC "DATA"
_DATA         ENDS
CONST         SEGMENT WORD PUBLIC "CONST"
CONST         ENDS
_BSS SEGMENT WORD PUBLIC "BSS"
_BSS ENDS
DGROUP   GROUP    CONST, _BSS, _DATA
    ASSUME DS: DGROUP, SS: DGROUP
DEMO_TEXT SEGMENT
    ASSUME CS: DEMO_TEXT
    PUBLIC  ?init@X@@RECXXZ    ; X::init
?init@X@@RECXXZ     PROC FAR    ; X::init
; Line 11
    push  bp
    mov   bp,sp
; this  = 6
    mov   bx,WORD PTR [bp+6]   ;this
; Line 12
    mov   es,WORD PTR [bp+8]
    mov   WORD PTR es:[bx],0 ; Loading "this"
    mov   ds,WORD PTR [bp+8]
    ASSUME DS: NOTHING
$F342:
; Line 13
    mov   ax,WORD PTR [bx]
    cwd
    add   WORD PTR [bx+2],ax
    add   WORD PTR [bx+4],dx
    inc   WORD PTR [bx]
    cmp   WORD PTR [bx],25    ;0019H
    jl    $F342
; Line 14
    push  ss
    pop   ds
    ASSURE DS: DGROUP   ; *** Must restore DS
    mov   sp,bp
    pop   bp
    ret   4
    nop
?init@X@@RECXXZ    ENDP
DEMO_TEXT    ENDS
END
```

As shown, accessing object data in this fashion with DS requires restoring DS—computationally, a very expensive operation (e.g., 20 or more cycles on a '386 processor).

Code generation in accordance with the present invention, on the other hand, would yield (BC++ —po version):

```
    .286p
    ifndef    ??version
?debug   macro
    endm
publicdll macro name
    public    name
    endm
$comm  macro name1dist,size,count
    comm dist name:BYTE:count*size
    endm
    else
$comm  macro name,dist,size,count
    comm dist name[size]:BYTE:count
    endm
    endif
    ?debug   V 300h
       ?debug  S "DEMO.cpp"
       ?debug  C E9FC71BD18096A6F686E732E637070
DEMO_TEXT segment byte public "CODE"
DEMO_TEXT ends
```

-continued

```
DGROUP   group DATA, BSS
    assume cs:DEMO_TEXT,ds:DGROUP
_DATA    segment word public "DATA"
d@ label    byte
d@w label   word
_DATA    ends
_BSS segment word public "BSS"
b@ label    byte
b@w label   word
_BSS ends
DEMO_TEXT segment byte public "CODE"
    ;
    ; X::init( )
    ;
        assume cs:DEMO_TEXT
@X@2init$qv  proc far
    ;
    ; {
    ;       for (i = 0; i < 25; i++)
    ;
        mov   word ptr [si],0    ; *** No overrides required
        jmp   short @1@86
@1@30:
    ;
    ;       j += i;
    ;
        mov   ax,word ptr [si]
        cwd
        add   word ptr [si+2],ax
        add   word ptr [si+4],dx
        inc   word ptr [si]
@1@86:
        cmp   word ptr [si],25
        jl    short @1@30
    ;
    ; }
    ;
@X@2init$qv  endp
    ?debug    C E9
    ?debug    C FA00000000
DEMO_TEXT ends
_DATA    segment word public "DATA"
s@ label    byte
_DATA    ends
DEMO_TEXT segment byte public "CODE"
DEMO_TEXT ends
    public       @X@2init$qv
_s@ equ s@
    end
```

Thus in contrast to conventional or present-day optimizing techniques, the object-oriented calling convention of the present invention allows an executing program to readily access an object. In particular, since an object's "this" pointer is already set up in DS:SI, one does not have to resort to an ES override (i.e., defeating the processor's normal use of a default segment base in DS) to access an object's methods or data members. Nor does one have to restore from an old DS. Access to virtual methods is particularly improved as the Virtual Dispatch Table, residing as near data, is immediately accessible from the "this" pointer which is stored in DS:SI.

As a further advantage, base-indexed address mode (i.e., [BX+SI] addressing) is preserved for accessing an object's data members and virtual table, thus allowing one to employ this powerful memory reference technique for addressing complex data structures. In addition, since the Object Data calling convention does not mandate how arguments are passed, it may be used in conjunction with other calling conventions, including _fastcall and C (i.e., _cdecl) calling conventions.

The calling convention of the present invention is particularly effective in reducing the size of Microsoft Windows programs. Specifically, one may advantageously employ the characteristic of Microsoft Windows that it does not routinely expect DS to be set to. DGROUP. Standard C functions, in contrast, do rely on DS being set to DGROUP:

```
push   ds
mov    ax,DGROUP
mov    ds,ax      ; Computationally expensive!
``` do call, then before returning:

```
pop DS      ; Computationally expensive!
```

In the instance of calling the Windows API (e.g., CreateWindow), Windows API functions may be prototyped such that they load their own DS (e.g., _loadds). In this manner, the computationally expensive segment register loads may be avoided. Other libraries may be prototyped in a similar fashion, as applicable. All told, the object-oriented memory model of the present invention employs Intel 80×86-compatible architecture most efficiently for object-oriented programming, both reducing a program's size and increasing its execution speed.

5. Object-oriented calling convention and multiple inheritance

According to the present invention, for multiple inheritance virtual calls a stub is generated which adjusts the 'this' pointer to be the correct one for the called member function. This is called a generic "stub." For example, for:

```
struct X { virtual void f(void) = 0; };
struct Y { };
struct Z: public Y, public X { virtual void f (void); };
void main (void) { Z a; }
``` the following stub is generated:

```
mov   bx,sp
add   word ptr ss:[bx+<offset>+<distModifier>],<adjustment>
jmp   <far or near>ptr <sym>
```

For object-oriented code generation (—po), a more efficient stub is generated:

```
add   si,<adjustment>
jmp   <far or near>ptr <sym>
```

For multiple, virtual inheritance with virtual function calls and a user-specified constructor, the compiler 220 preferably generates a stub to adjust the 'this' pointer when the virtual function is called. For example, the following code would need such a stub.

```
struct X { virtual void f(void) = 0; };
struct Y { };
struct Z: public Y, public virtual X
{
```

```
    Z( );
        virtual void f (void);
    };
    Z::Z( ) { }
```

Exemplary instructions generated are:

```
mov     bx, sp
les     bx, dword ptr ss:[bx+4]    ;; load "this" into es:bx
mov     ax,.es:[bx-2]              ;; load vtable displacement
add     ax, 65529                  ;; add adjustment
mov     bx,sp
add     as: [bx+4 ], ax            ;; add adjustment to "this"
jmp     far ptr @Y@1bar$qv         ;; jump to targetSym
```

For object-oriented code generation, this will include:

```
mov     ax,[si-2]                  ;; load vtable pointer
add     ax, 65529                  ;; add <adjustment>
                                   ;; (it's negative)
add     si,ax
jmp     far ptr @Y@1bar$qv         ;; jump to targetSym
```

More preferably, this is achieved in three instructions, as follows:

```
        mov     bx,[si-2]
        lea     si,[si+bx+65529]
        jmp     far ptr @Y@1bar$qv
```

C++ member pointers to virtual functions may employ a thunk to get the correct virtual function to call. For example, the following code requires a thunk.

```
        struct X
        {
            virtual f ( );
        };
        (X::*p) ( ) = &X::f;
```

The compiler 220 generates a code sequence, such as (here the virtual table is far):

```
        mov bx,sp
        les bx,ss:[bx+4]
        les bx,es:[bx+0]
        jmp dword ptr es:[bx]
```

Alternatively, in object-oriented code generation, a thunk like the following may be generated:

```
les  bx,[si+0]                ; 0 is the vptrOffset
jmp dword ptr es: [bx]        ; 0 is the vtblOffset
```

Attached hereto is an Appendix A containing trace listings of code generation for passing classes by value, which provide a description of the invention operative in a general purpose digital computer system, such as an IBM-compatible personal computer. Also attached hereto is an Appendix B containing additional source listings illustrating code generation employing the object-oriented calling convention of the present invention in the instance of multiple inheritance. Finally, user and programmer guides and additional reference materials providing additional description for the development system of the present invention are appended as Appendix C.

While the invention is described in some detail with specific reference to a single preferred embodiment and certain alternatives, there is no intent to limit the invention to that particular embodiment or those specific alternatives. For example, while methods of the present invention have been illustrated in conjunction with 16-bit registers, those skilled in the art will appreciate that these methods are also operative in architectures of 32-bit, 48-bit, 64-bit, and the like. While the preferred embodiment has been described with reference to an Intel 80×86-compatible architecture, the methods of the present invention may be advantageously applied to other systems, particularly object-oriented ones embodied in segmented architectures. Moreover, those skilled in the art will appreciate that the principles of the present invention may readily be employed in systems having virtual memory addressing schemes (e.g., 80386 and 80486). Thus, the true scope of the present invention is not limited to any one of the foregoing exemplary embodiments but is instead defined by the following claims. v,1-12/2

What is claimed is:

1. In a system for compiling C++ source listings into code for operating a computer, the source listings including C++ objects instantiated from C++ classes defining class methods and data members, the system including a memory and a processor having registers for loading segment and offset addresses of memory locations, a method for controlling access to said methods and data members, the method comprising:

(a) defining a class of objects, said class including data members and methods operative on said data members;

(b) creating an object of said defined class by storing data members for said object at a default data segment in said memory;

(c) maintaining a segment address for said data segment in a data segment addressing register of said processor; and (d) accessing said data members by loading an offset into a selected register, whereupon said data members are accessed by combining said segment address stored in said data segment address register with said offset stored in said selected register.

2. The method of claim 1, wherein said offset includes a 16-bit memory address.

3. The method of claim 2, wherein said combining said segment address with said offset generates a 20-bit memory address.

4. A system for developing compiled computer code, the system comprising:

a computer having a processor and a memory, said memory including a plurality of memory segments, and said processor including a data segment register for addressing a memory segment storing data;

a compiler for generating computer code from source listings, said source listings including definitions of classes of objects having data members and methods operative on said data members, said source listings also including declarations of objects from said classes, whereby an object inherits data members and methods from at least one class;

means, operably coupled to said compiler, for instructing said processor to create at least one object from said at least one class by storing data members of said at least one object in a single segment of the memory and loading said data segment register with a segment address of said single segment, said data members being stored at an offset in said single segment; and means, operably coupled to said compiler, for instructing said processor to access said stored data members of said at least one object by combining said segment address loaded in said data segment register with said offset.

5. The system of claim 4, wherein said processor further comprises an indexing register for storing said offset within said single segment, and wherein said system further comprises means, operably coupled to said compiler, for instructing said processor to access said data members of said at least one object with a segment/offset address formed from said segment address stored in said data segment register and said offset stored in said indexing register.

6. The system of claim 5, further comprising means, operably coupled to said compiler, for instructing said processor to access said methods of said at least one object with said segment/offset address formed from said data segment register and said indexing register.

7. The system of claim 5, wherein said processor is an Intel 80×86-compatible processor, said data segment register is an 80×86 data segment (DS) register, and said indexing register is an 80×86 source index (SI) register, so that access to data members of said at least one object is provided by a DS:SI register pair address.

8. The system of claim 5, wherein said processor is an Intel 80×86-compatible processor, and said indexing register is a selected one of a group comprising an 80×86 source index (SI) register, an 80×86 destination index (DI) register, and an 80×86 base (BX) register, so that access to said at least one object is provided by forming a segment/offset address by combining said data segment register with an indexing register selected from said group.

9. In a system for compiling source listings into code for operating a computer, said computer including a processor and a memory, said source listings comprising C++ objects instantiated from C++ classes having C++ data members and C++ methods operative on said data members, an improved method for accessing said data members, the method comprising:

(a) allocating a region from said memory as a default data segment, said default data segment being located in said memory at a particular segment address;

(b) storing said C++ data members of said C++ objects in said default data segment, said C++ data members residing at an offset in said default data segment;

(c) storing said particular segment address of said default data segment in a segment register of said processor, so that references to said C++ data members in said C++ source listings comprise near addresses, said near addresses including an implicit segment address to said default data segment; and (d) accessing said C++ data members during runtime execution of said C++ methods by combining said segment address of said default data segment stored in said segment register with said offset.

10. The method of claim 9, further comprising:

(e) storing a table of memory addresses in said default data segment of the memory, said table storing a function pointer for each of said C++ methods; and (f) during runtime execution of said C++ methods, invoking a particular C++ method by executing processor instructions stored at a memory location pointed to by the function pointer for the particular C++ method, said function pointer for the particular C++ method being accessed at runtime by combining said segment address of said default data segment stored in said segment register with said offset.

11. The method of claim 9, wherein said processor comprises an 80×86-compatible microprocessor and wherein step (c) includes:

storing said particular segment address of said default data segment in a DS segment register of the processor.

12. The method of claim 9, wherein step (d) includes forming an address for a particular C++ data member being accessed by:

storing said offset in an index register of said processor; and forming an address for said particular C++ data member by combining said segment address stored in said segment register, said offset address stored in said index register, and a particular offset for said particular C++ data member.

13. A computer program stored on a computer readable medium, comprising:

code that receives object-oriented source code listings, said source code listings including a declaration of an object that is a member of a class, said declaration specifying data members of said object;

code that stores said object including said data members at a first offset within a default data segment, wherein a data segment addressing register specifies a location of said default data segment; and code that accesses said data members of said object in said default data segment by combining said data segment addressing register with said first offset.

14. The computer program of claim 13, wherein a specific data member is accessed by combining said data segment addressing register, said first offset, and a second offset of said specific data member within said object in said default data segment.

15. The computer program of claim 13, wherein said declaration further specifies methods of said at least one object.

16. The computer program of claim 15, further comprising code that stores a table in said default data segment, said table including a second offset of each of said methods within said object in said default data segment.

17. The computer program of claim 16, further comprising code that invokes a specific method by executing instructions at a location indicated by combining said data segment addressing register, said first offset, and said second offset in said table for said specific method.

18. The computer program of claim 13, wherein said data segment addressing register is a data segment (DS) register in an Intel 80×86-compatible processor.

19. The computer program of claim 18, wherein said first offset is stored in a first register, wherein said first register is a source index (SI) register, a destination index (DI) register or a base (BX) register in an Intel 80×86-compatible processor.

* * * * *